UNITED STATES PATENT OFFICE.

WILHELM KRISCHE, OF HANOVER, AND ADOLF SPITTELER, OF WOLFRATS-HAUSEN, GERMANY.

PROCESS OF MANUFACTURING WATER-RESISTING PRODUCTS FROM CASEIN.

SPECIFICATION forming part of Letters Patent No. 646,844, dated April 3, 1900.

Application filed October 20, 1897. Serial No. 656,029. (No specimens.)

*To all whom it may concern:*

Be it known that we, WILHELM KRISCHE, a subject of the King of Prussia, German Emperor, and a resident of Hanover, Kingdom of Prussia, and ADOLF SPITTELER, a citizen of Switzerland, and a resident of Wolfratshausen, near Munich, in the Kingdom of Bavaria, German Empire, have invented an Improved Process of Manufacturing Water-Resisting Products from Casein, of which the following is a specification.

The insoluble products heretofore manufactured from casein by coagulating casein solutions by means of salts or acids or by evaporating casein solutions with formaldehyde or by immersing in formaldehyde the soluble residue left by evaporating casein solutions do not resist the action of water, but swell up therein, losing their hard tenacious properties.

By the present invention a product is manufactured which resembles horn in its properties in respect of appearance, hardness, tenacity, and resistance to water. For this purpose soluble casein is rendered insoluble by the action of acids or salts and is then treated with formaldehyde, either while it is wet or after it has been dried.

For example, a solution of casein is prepared by dissolving casein in water containing five per cent. of sodium carbonate and is coagulated by gradually adding a suitable salt, such as a weak solution of lead acetate. The completion of the coagulation is recognized by the liquid around the coagulum becoming clear and colorless. The wet coagulum thus obtained is ground with water to a uniform consistence, and the creamy mass is poured into a mold and the water is allowed to drain away, for which purpose the mold preferably has a sieve-bottom and is placed on an absorbent surface. When the mass is sufficiently firm to handle, it is removed from the mold and allowed to dry until it is slightly translucent. In this condition it is placed over night in an aqueous solution containing about twenty per cent. of formaldehyde and is afterward dried, preferably under slight pressure, to avoid warping.

It is obvious that the ground creamy coagulum may be mixed with any suitable coloring-matter or the like and that immersion in a solution of formaldehyde is not essential, since the formaldehyde may be applied with a brush or the casein material may be exposed to vapor of formaldehyde. All that is essential to our invention is that the casein to be treated must be in the insoluble form as obtained by coagulation of casein solutions by means of acids or salts.

Having thus described the nature of this invention and the best means we know of carrying the same into practical effect, we claim—

The process herein described for the manufacture from casein of a product resisting the action of water which process consists in rendering soluble casein insoluble by means of acids or salts and treating with formaldehyde the insoluble casein thus obtained.

In testimony whereof we have signed this specification in the presence of two subscribing witnesses.

WILHELM KRISCHE.
ADOLF SPITTELER.

Witnesses:
R. HERPICH,
G. FISCHER.